(12) United States Patent
Basso et al.

(10) Patent No.: US 9,088,594 B2
(45) Date of Patent: Jul. 21, 2015

(54) PROVIDING TO A PARSER AND PROCESSORS IN A NETWORK PROCESSOR ACCESS TO AN EXTERNAL COPROCESSOR

(75) Inventors: Claude Basso, Raleigh, NC (US); Jean L. Calvignac, Raleigh, NC (US); Chih-jen Chang, Apex, NC (US); Philippe Damon, Chapel Hill, NC (US); Natarajan Vaidhyanathan, Carrboro, NC (US); Fabrice J. Verplanken, LaGaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 13/365,679

(22) Filed: Feb. 3, 2012

(65) Prior Publication Data
US 2012/0204002 A1 Aug. 9, 2012

(30) Foreign Application Priority Data

Feb. 7, 2011 (EP) ...................................... 11305124

(51) Int. Cl.
*G06F 9/30* (2006.01)
*H04L 29/06* (2006.01)

(52) U.S. Cl.
CPC ...................................... *H04L 69/12* (2013.01)

(58) Field of Classification Search
None
See application file for complete search history.

(56) References Cited

U.S. PATENT DOCUMENTS

| | | | |
|---|---|---|---|
| 6,754,223 B1 | 6/2004 | Lussier et al. | |
| 7,174,394 B1 * | 2/2007 | Garner et al. | 710/5 |
| 7,272,675 B1 | 9/2007 | Paul et al. | |
| 7,428,618 B2 | 9/2008 | Najam et al. | |
| 8,065,503 B2 | 11/2011 | Jia | |
| 8,250,308 B2 | 8/2012 | Papazova et al. | |
| 2003/0041172 A1 * | 2/2003 | Calvignac et al. | 709/246 |
| 2003/0056032 A1 * | 3/2003 | Micalizzi et al. | 710/5 |
| 2003/0145230 A1 * | 7/2003 | Chiu et al. | 713/201 |
| 2006/0174058 A1 | 8/2006 | Sikdar et al. | |
| 2008/0091649 A1 * | 4/2008 | Lim et al. | 707/3 |
| 2009/0019225 A1 | 1/2009 | Maeda | |
| 2010/0268758 A1 * | 10/2010 | Boykin et al. | 709/203 |
| 2012/0204190 A1 | 8/2012 | Basso et al. | |

OTHER PUBLICATIONS

Dally, William J. et al., "Architecture of a Message-Driven Processor", ACM, Jun. 1987, pp. 189-196.

(Continued)

*Primary Examiner* — William B Partridge
(74) *Attorney, Agent, or Firm* — Stephen R. Tkacs; Stephen J. Walder, Jr.; Steven L. Bennett

(57) ABSTRACT

A mechanism is provided for sharing a communication used by a parser (parser path) in a network adapter of a network processor for sending requests for a process to be executed by an external coprocessor. The parser path is shared by processors of the network processor (software path) to send requests to the external processor. The mechanism uses for the software path a request mailbox comprising a control address and a data field accessed by MMIO for sending two types of messages, one message type to read or write resources and one message type to trigger an external process in the coprocessor and a response mailbox for receiving response from the external coprocessor comprising a data field and a flag field. The other processors of the network poll the flag until set and get the coprocessor result in the data field.

16 Claims, 5 Drawing Sheets

(56) References Cited

OTHER PUBLICATIONS

Albrecht, C et al., "Performance Analysis of Bus-Based Interconnects for a Run-Time Reconfigurable Co-Processor Platform", 16th Euromicro Conference on Parallel, Distributed and Network-Based Processing, 2008, PDP 2008, Issue Date: Feb. 13-15, 2008, pp. 200-205.

Bux, Werner et al., "Technologies and Building Blocks for Fast Packet Forwarding", IEEE Communications Magazine, Jan. 2001, pp. 70-77.

Carr, Dave et al., "Co-Processors Help Meet Packet Processing Challenges", Lightwave, Feb. 28, 2005, 3 pages.

Kachris, C, "Analysis of a Reconfigurable Network Processor", 20th International Parallel and Distributed Processing Symposium, 2006, IPDPS 2006, Issue Date: Apr. 25-29, 2006, 8 pages.

Ohlendorf, R et al., "Chapter 17, FlexPath NP—Flexible, Dynamically Reconfigurable Processing Paths in Network Processors", Dynamically Reconfigurable Systems, DOI 10.1007/978-90-481-3485-4_17, Springer Science+Business Media B.V., 2010, pp. 355 and 358.

Rajkamal, R et al., "Packet Classification for Network Processors in WSN Traffic Using Ann", 6th IEEE International Conference on Industrial Informatics, 2008, INDIN 2008. Issue Date: Jul. 13-16, 2008, pp. 707-710.

USPTO U.S. Appl. No. 13/365,778, Jan. 9, 2013, 1 page.

Notice of Allowance mailed Feb. 14, 2013 for U.S. Appl. No. 13/365,778, 16 pages.

USPTO U.S. Appl. No. 13/891,825, May 13, 2013, 1 page.

Reibman, Andrew L., "Modeling the Effect of Reliability on Performance", IEEE Transactions on Reliability, vol. 39, No. 3, Aug. 1990, pp. 314-320.

\* cited by examiner

US 9,088,594 B2

PROVIDING TO A PARSER AND PROCESSORS IN A NETWORK PROCESSOR ACCESS TO AN EXTERNAL COPROCESSOR

BACKGROUND

This invention generally relates to network processing; more particularly; the invention aims at providing an implementation to allow access to an external coprocessor by a parser and other processors from a same network processor.

High performance network processors on one chip may have to handle sophisticated network functions. Particularly a packet parser, for instance in an Ethernet adapter, may have to support high level packet classification and packet filtering functions which cannot be all handled on a chip. In these circumstances, the parser will have to kick-off some packet processing functions to an external coprocessor and get in return the result from the coprocessor in order to use it as an input to its own packet process result.

It is common to decide for externalizing network processing functions from the packet parser because different functions may require different processing architecture and performance, the network processor chip being not able to include all these characteristics. The other good reason is an area limitation problem on the chip as packet parsing additional network function may require logic and arrays which may be very large.

A typical additional network processing function which may be externalized by the packet parser to the coprocessor is packet classification including, as an example, a lookup in a ternary content addressable memory (TCAM) or a hash-based lookup for which different search algorithm are employed (Patricia tree, Cuckoo algorithm etc.). One other function which can be externalized by the packet parser to the coprocessor is the packet filtering functions which are based on recognition of patterns extracted from the packet.

When other processors in the network processor need also to externalize software functions towards the same external coprocessor as the per-port parser in the network adapter of the network processor a physical connection to the external coprocessor needs to be added inside the network processor to allow to support this additional 'software path'. As the processors are connected to the internal bus, an implementation of a physical connection for software path would comprise a bus interface unit and bi-directional serialized lines towards the external coprocessor. This additional implementation may become very costly in terms of silicon area in a single chip network processor.

The U.S. Pat. No. 7,428,618 relates to a network node structure architected around two Net Processors, one for each direction of packet streams, communicating through a shared memory. The structure is complemented with a set of coprocessors located on a daughter card. All coprocessors are interconnected via hardware Control Logic which also provides an interface to one of the two Net Processors, via a dedicated memory. In this prior art document, there is no description of a mixed type of interface needed between the network processor and the external coprocessor. The externalization of processing functions to the external coprocessor is rather based on single requestor (a Net processor) that can dispatch requests to multiple coprocessors. This is opposed to the architecture in which the coprocessor requestors are a parser module and software entities.

SUMMARY

It is an object of the present invention to provide a method and system for connecting processors to an external coprocessor in a network processor having already a per-port parser located in a network adapter of the network processor connected to the same external coprocessor. Furthermore, in the case, for instance, where the network processor is single chip implemented, there is a need for providing a connection using a minimum of silicon area.

In one illustrative embodiment, a method is provided to share a communication link established between a parser logic in a network adapter of a network processor and an external coprocessor, with processors in the network processor to request that a process be executed on said external coprocessor. The method comprises the processors in the network processor sending to two request mailbox registers of the network processor connected to the external coprocessor, one request mailbox register receiving a command and an address, and one request mailbox register receiving request data. The method further comprises an arbiter algorithm between request from the parser logic and request from the processors triggering sending the two request mailbox registers to the external coprocessor sending a response flag and response data to two response mailbox registers of the network processor connected to the external coprocessor one response register receiving a response flag and one response register receiving response data. The method further comprises the processors in the network processor polling the first response mailbox register until a flag is received and upon reception of a flag in the mailbox response register, reading the response data received in the second response register.

In another illustrative embodiment, a computer program product comprises programming code instructions for executing the steps of the method when said program is executed on a computer.

In another illustrative embodiment, a system is adapted for carrying out the method.

DETAILED DESCRIPTION

Figure 1:
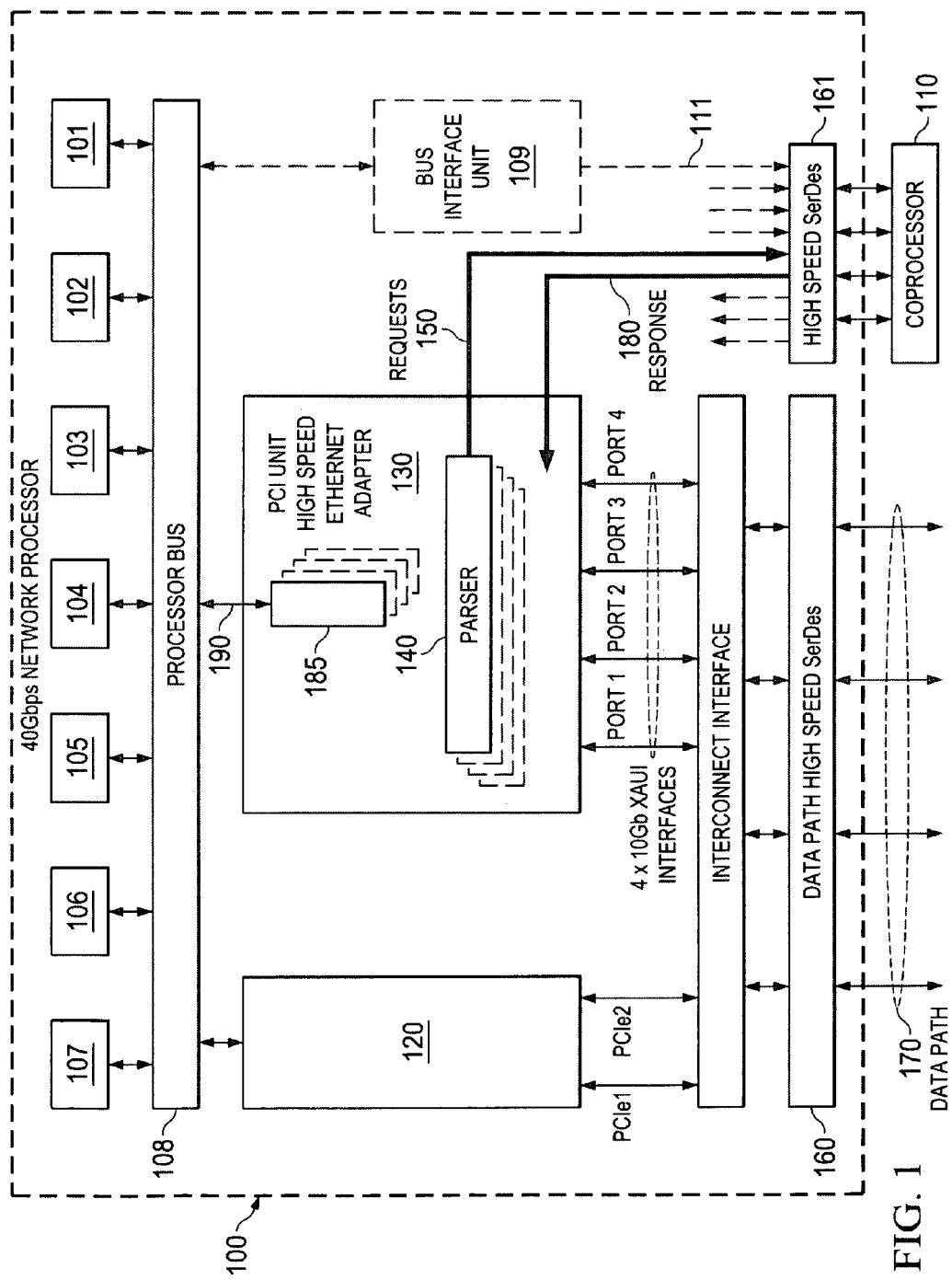
FIG. 1 is a global view of a network processor with its main functions, output lanes and parser connection to an external coprocessor in which aspects of the illustrative embodiments may be implemented.

FIG. 1 is a global view of a network processor in which aspects of the embodiment may be implemented with its per port parser function and parser connection to an external coprocessor. FIG. 1 is a global view of an illustrative 40 Gbps network processor (100) which exchanges data with a computer not represented here, if top-down described, implements processing functions with specialized processors (101 to 107) connected to an internal processor bus (108). Two illustrative main network protocols are supported by this network processor, by a peripheral component interconnect (PCI) unit (120) connected to the internal bus (108) and supporting outside connections, for instance to a universal serial bus (USB) port and by an Ethernet adapter (130) supporting 4×1.0 Gbps IEEE standardized 10 GB sixteen-bit interface (XSBI) attachment unit interface (XAUI) interfaces (Port 1, Port 2, Port 3 and Port 4) which represents the Ethernet packet data path. The PCI and Ethernet data traffic are merged through an Interconnect Interface to the 4 Ethernet ports (Port 1, Port 2, Port, 3 and Port 4). The PCI and Ethernet data traffic is then serialized (top-down traffic) in a High Speed SerDes (160), the resulting high speed data path (170) comprising 4 serialized lanes of 4×2 for transmit and received as it is bi-directional.

The high speed Ethernet adapter (130) receives packets of data path (170) from high speed links deserialized in a high speed serdes (serializer/deserializer) (160) through the standard XAUI interface on four Ethernet ports. On each Ethernet port, each Ethernet packet received is analyzed by the use of a parser (140) the per port parser result being managed by a logic (185) which receives the parser result and sends this result (190) for further processing into specialized processors (101-107) via processor bus (108).

At any time during a packet parsing window, a parser may need to externalize a parsing function to an external coprocessor; note that the request to the external processor is not mandatory, the parser may not externalize packet processing for all data packets. The coprocessor is qualified as 'external' to the network processor (100) which is implemented in one chip. It is noted that four inputs are represented on the coprocessor hut the number of inputs on an external coprocessor is variable.

The parser triggers 'request' message encoding, serializing and transmission to the coprocessor (110). In its bottom-up path, the parser deserializes and decodes the 'response' message received from the coprocessor, and it merges this result with the result of its own packet process. The requests are sent on a connection link (150) to the external coprocessor which sends a response containing the coprocessor result on a connection link (180). Note that in the example where the coprocessor is a field programmable gate array (FPGA) with four inputs, each input can be assigned to externalization of one per port parser so that for each Ethernet port, packet processing one 4-tuple is assigned comprising: (parser (140), link to send request (150), link to receive response (180)). It is noted that the links and high speed Serdes (161) for connecting the parser to the external coprocessor are just represented for comprehension, their implementation are not the object of the present description.

To allow the processors (101 to 107) to send request to the external processor the usual way would be to add a bus interface unit (109) and serial lines (111) towards the external coprocessor.

The solution according to the illustrative embodiment is to allow the software path to use the same connection (150) as for the parser path and to add logic to manage in the Ethernet adapter (130) the sending of requests and reception of response for parser path a software path on the same lines.

Figure 2:
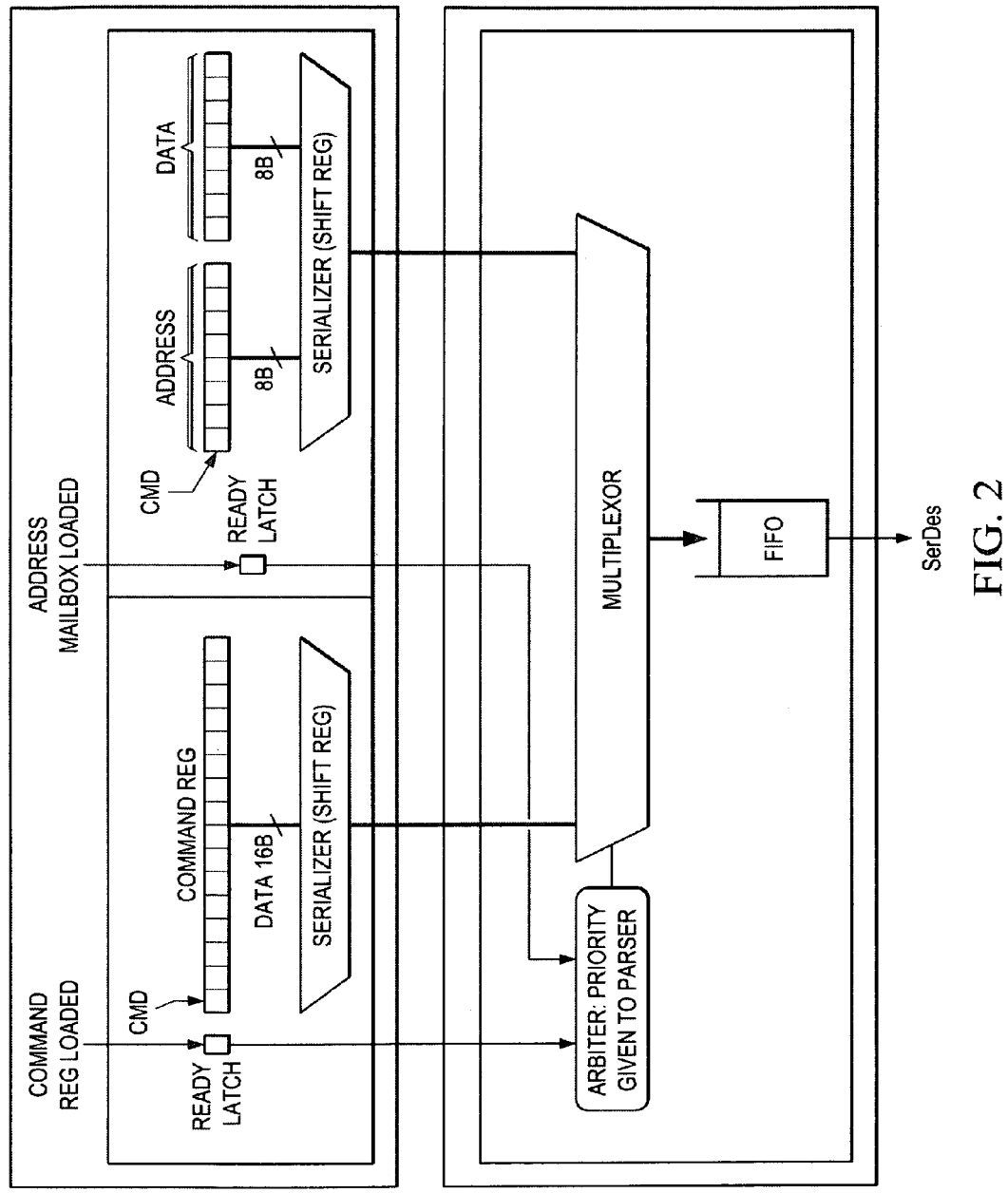
FIG. 2 illustrates the logic for sending requests from the parser path and the software path to the external coprocessor according to an illustrative embodiment.

FIG. 2 illustrates the logic for sending requests from the parser path and the software path to the external coprocessor according to an illustrative embodiment.

A software path is made available to perform configuration and monitoring of the External Coprocessor via a mailbox, preferably a memory mapped input/output (MMIO) Mailbox.

The software path supports the transmission of functional requests by Software to the External Coprocessor, and reception of responses from the External Coprocessor to be further used by the processors of the network processor.

The transmission by Software comprises a Send Mailbox organized in two parts:
8-Byte Data Register; and
8-Byte Command Register.

Software loads first the Data Register via a first MMIO write access (except when requesting a read to External Coprocessor, Data Register not used in that case) and then loads the Command Register via a second MMIO write access. The first byte of the Command Register contains the Command Byte. As soon as the Command Register is loaded, the transmission of the request is initiated.

Three request formats are defined:
MMIO Write: 1B Command+4B Address+8B Data;
MMIO Read: 1B Command+4B Address; and
Functional Request: 1B Command+1B Length+1B to 14B Data.

The transmission of the request is arbitrated with the parser request, for instance under a round-robin algorithm, then the same process as for parser is used except that a different 10b SOP encoding is used to differentiate the two types of requests.

Figure 3:
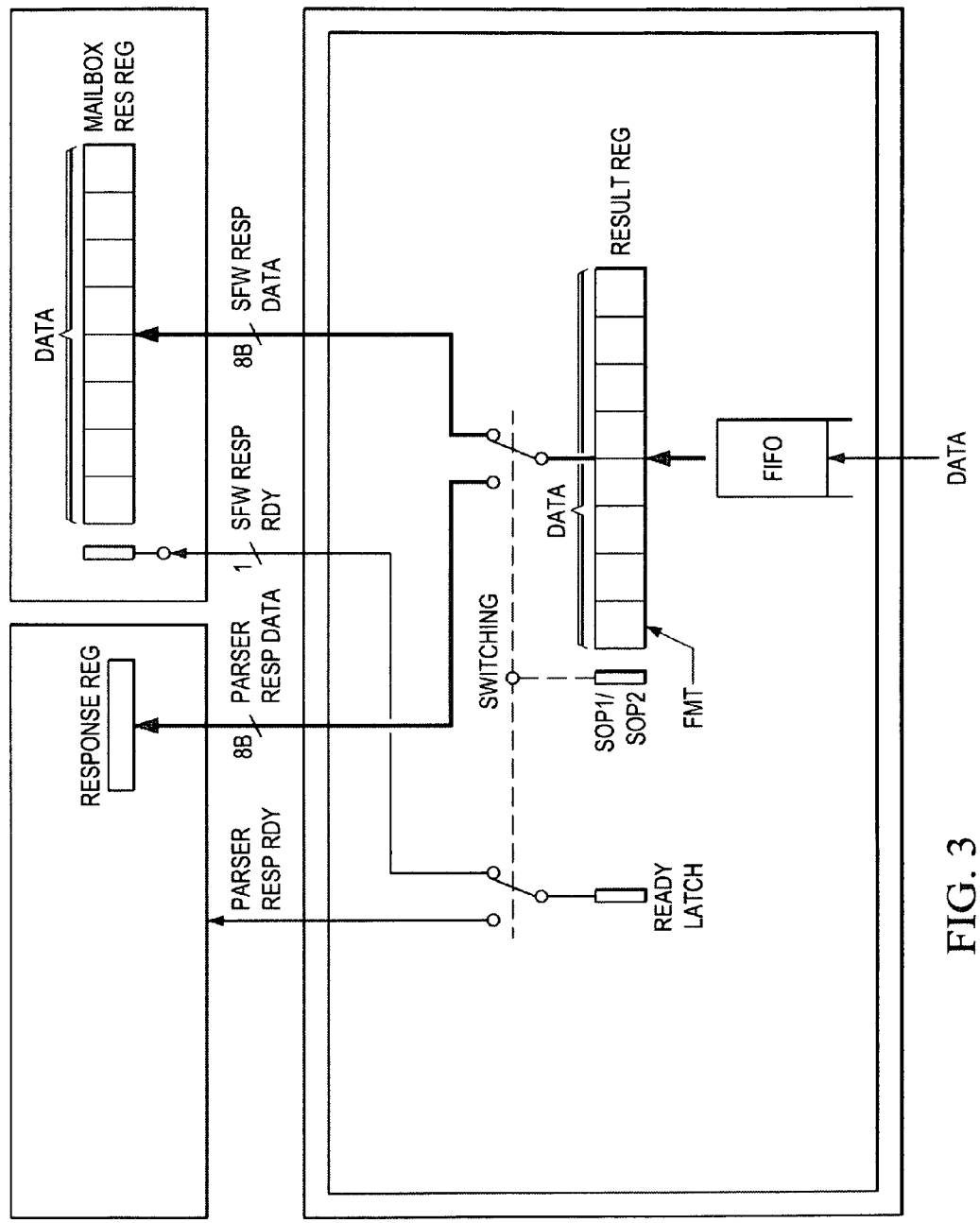
FIG. 3 illustrates the logic for receiving responses from the external coprocessor for the parser path and the software path according to an illustrative embodiment.

FIG. 3 illustrates the logic for receiving responses from the external coprocessor for the parser path and the software path according to an illustrative embodiment.

The reception of responses follows the same path as responses for the parser, except that when the response has been reassembled in the Result Register, it is sent to the Receive Mailbox for Software.

The Receive Mailbox is organized in two parts:
8-Byte Data Register; and
1-bit Response Ready flag.

Software polls the Response Ready flag until it is set by the parser when the reassembled response is loaded in the Data part of the mailbox.

Then it reads the Result in the Data part of the mailbox, which automatically triggers the reset of the Response Ready flag.

According to the parser path, the parser assembles request messages in the input registers of the parser. The assembly is complete when the parser fills the 'Command Byte' of the message, which triggers its encoding, serialization, and transmission to the external coprocessor. Then the parser deserializes and decodes the response message received from the external coprocessor, and it merges this result with the result of its own packet process. Four message formats allow several levels of result merging.

Software Path

The software assembles request messages in a 'Request Mailbox' accessed by MMIO. This mailbox is in the parser and contains two registers: Command/Address and Data. Two types of messages are defined:
MMIO messages to read and write resources in the external coprocessor; and
Functional messages (similar to parser path) to trigger an external process in the external processor.

The corresponding response message received from the external coprocessor is deserialized and decoded, and then exposed to software in an MMIO 'Response Mailbox' also part of the coprocessor, and containing two registers: Flag and Data. Software is polling the Flag until set, and then gets the coprocessor result by reading the Data part of the mailbox.

Both paths are multiplexed at message level under round-robin arbitration. The PCS (Physical coding sublayer) and serdes layers are common. Line coding is a simplified form of PCIe PCS, with delineation of messages using two forms of SOP so that the response messages can be steered to the Parser side or Software side of the parser.

Error protection is provided by a compact 8-bit CRC to detect corruption, and by 7-bit sequence numbers to detect loss.

Figure 4:
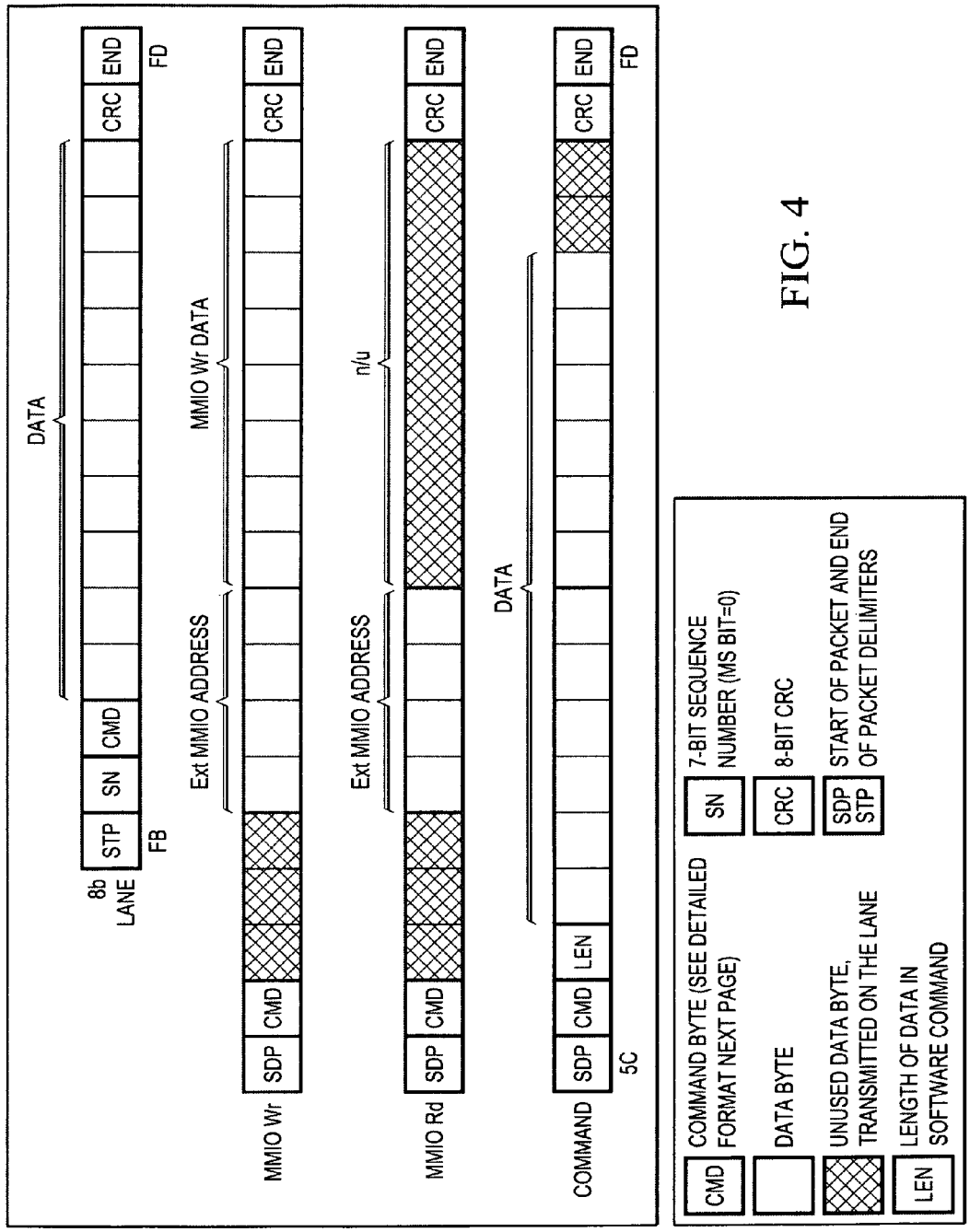
FIG. 4 illustrates the format of requests for the parser path and the software path sent from the network processor to the external coprocessor according to an illustrative embodiment.

FIG. 4 illustrates the format of requests for the parser path and the software path sent from the network processor to the external coprocessor according to an illustrative embodiment.

The left side represents requests sent by the parser comprising a command (CMD), a data bit field (DATA) and a sequence number (SN). The external coprocessor will respect the sequencing of the parser request which corresponds to the sequence of data packets received by the parser in the network processor. After crossing the different network layers in the network processor, the start of packet and end of packet delimiters are set (STP, END). A CRC field is added for checking in the external coprocessor corrupted requests.

The right side represents requests sent by the processors which may be of three different formats. They comprise a command (CMD), mailbox address used in a MMIO area in the preferred embodiment where the mailbox is implemented using the MMIO technology. The data bytes are written in the MMIO area in the preferred embodiment (DATA BYTE). In the preferred embodiment, as the data byte fields is of variable length a data length Is conveyed in a length byte filed (LEN). After crossing the different network layers in the network processor, the start of packet and end of packet delimiters are set (SDP, END). A CRC field is added for checking in the external coprocessor corrupted requests.

Figure 5:
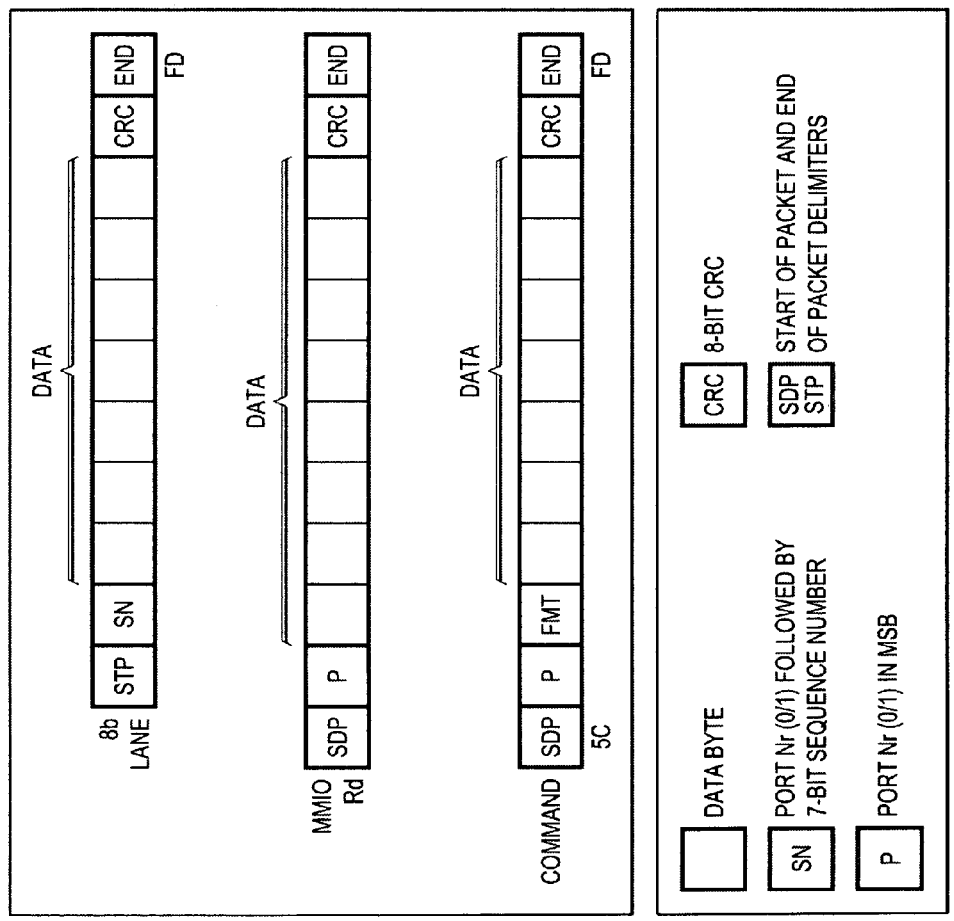
FIG. 5 illustrates the format of responses for the parser path and the software path sent from the external coprocessor to the network processor according to an illustrative embodiment.

FIG. 5 illustrates the format of responses for the parser path and the software path sent from the external coprocessor to the network processor according to an illustrative embodiment.

The left side represents response sent by the external coprocessor to the logic managing parser results in the network processor. It comprises a data bit field (DATA) and the sequence number (SN) which was set in the request by the parser and that the coprocessor has maintained during its processing of the request. After crossing the different network layers in the external coprocessor, the start of packet and end of packet are set in the response (STP, END). A CRC field is added for checking in the network processor the corrupted response from the external coprocessor.

The right side represents response sent by the external coprocessor to the mailbox registers in the network processor. The data field is of a fixed length. An optional format byte field (FMT) indicates the type of the response to be used by the receiving processors in the network processor. After crossing the different network layers in the external coprocessor, the start of packet and end of packet are set in the response (SDP, END). A CRC field is added for checking in the network processor the corrupted response from the external coprocessor.

A Port byte field (P) is optionally used in the response to indicate to which Ethernet port this response is related.

It is noted that the start of packet delimiters (STP and SDP) used in the request and response between the processor mailbox registers and the external coprocessor may be used by the receiver to steer the request and the response to the appropriate parser or processor side. Alternatively and not represented in FIG. 4 and FIG. 5, the coprocessor may also steer the request to the appropriate parser or processor side based on a bit inside the command byte field (CMD) of the request.

The solution of the preferred embodiment allows to share a part of the physical connection of a per-port parser of the network processor which will avoid the use of a new bus interface unit and serial lines dedicated to the processors. On this common physical connection are supported two paths, the parser path and the software path. The main functional path is used by the parser (parser path), the second path is used by the processors (software path) for configuration and functional flows. The two paths are arbitrated for instance through a round-robin algorithm and communicate with the external coprocessor via short messages under simple formats and exchanged on a set of serial lanes. Error correction is provided by a compact 8-bit cyclical redundancy check (CRC) to detect corruption and by 7-bit sequence numbers to detect loss.

The solution is cheap because the internal logic is limited, fast because of limited clock cycle to implement path control; globally this solution is particularly adapted for embedded systems. Furthermore, with the illustrative embodiment, the request format being similar for parser path and software path the reuse of parser connection can be done at the entry of requests which allows using a maximum of the existing connection already established for the parser.

The invention claimed is:

1. A method to share a communication link established between parser logic in a network adapter of a network processor and an external coprocessor, with processors in the network processor to request that a process be executed on said external coprocessor, said method comprising:
   a processor in the network processor sending request data and a command to request mailbox registers of the network adapter connected to the external coprocessor, wherein the request mailbox registers comprise a first request mailbox register that receives a command and an address and a second request mailbox that receives request data;
   sending the request data to the external coprocessor; and
   receiving response data and a response ready flag in response mailbox registers of the network adapter, wherein the response mailbox registers comprise a first response mailbox register that receives the response flag and a second response mailbox register that receives the response data; and
   the processor in the network processor reading the response data received in the response mailbox registers.

2. The method of claim 1, wherein sending the request data to the external coprocessor comprises:
   receiving the request data in the second request mailbox register;
   receiving the command in the first request mailbox register; and
   initiating transmission of the request data to the external coprocessor responsive to receiving the command in the first request mailbox register.

3. The method of claim 1, wherein reading the response data received in the response mailbox registers comprises:
   the processor in the network processor polling the first response mailbox register for the response ready flag; and
   responsive to the processor in the network processor detecting the response ready flag, the processor in the network processor reading the response data from the second response mailbox register.

4. The method of claim 1, wherein the request mailbox registers are memory mapped input/output (MMIO) registers.

5. The method of claim 1, wherein the response mailbox registers are MMIO mailbox registers.

6. A network processor comprising:
   a processor bus;
   a plurality of processor connected to the processor bus;

a network adapter connected to the processor bus and an external coprocessor, wherein the network adapter comprises request mailbox registers and response mailbox registers, wherein a given processor within the plurality of processors sends request data and a command to the request mailbox registers, wherein the request mailbox registers comprise a first request mailbox register that receives a command and an address and a second request mailbox that receives request data;

wherein the network adapter sends the request data to the external coprocessor;

wherein the network adapter receives a response ready flag and response data from the external coprocessor in the response mailbox registers, wherein the response mailbox registers comprise a first response mailbox register that receives the response flag and a second response mailbox register that receives the response data; and wherein the given processor reads response data from the response mailbox registers.

7. The network processor of claim 6, wherein sending the request data to the external coprocessor comprises:

receiving the request data in the second request mailbox register;

receiving the command in the first request mailbox register; and initiating transmission of the request data to the external coprocessor responsive to receiving the command in the first request mailbox register.

8. The network processor of claim 6, wherein reading the response data received in the response mailbox registers comprises:

the given processor polling the first response mailbox register for the response ready flag; and responsive to the given processor detecting the response ready flag, the given processor reading the response data from the second response mailbox register.

9. The network processor of claim 6, wherein the request mailbox registers are memory mapped input/output (MMIO) registers.

10. The network processor of claim 6, wherein the response mailbox registers are MMIO mailbox registers.

11. The network processor of claim 6, wherein the network adapter is connected to the external coprocessor via a high speed serializer/deserializer in the network processor.

12. The network processor of claim 6, wherein the network adapter in the network processor comprises a parser.

13. The network processor of claim 6, wherein the network adapter is connected to an external data path via an interconnect interface and a data path high speed serializer/deserializer.

14. A computer program product comprising a non-transitory computer readable storage medium having a computer readable program stored therein, wherein the computer readable program, when executed on a given processor in a network processor, causes the given processor to:

write request data to a first request mailbox register in a network adapter in the network processor, wherein the network adapter is connected to an external coprocessor;

write a command and an address to a second request mailbox register in the network adapter such that responsive to the command being received in the second request mailbox register, the network adapter sends the request data to the external coprocessor;

polling a first response mailbox register in the network adapter for a response ready flag; and reading response data from a second response mailbox register in the network adapter responsive to detecting the response ready flag.

15. The computer program product of claim 14, wherein the first and second request mailbox registers are memory mapped input/output (MMIO) registers.

16. The computer program product of claim 14, wherein the first and second response mailbox registers are MMIO mailbox registers.

* * * * *